US012271254B2

(12) United States Patent
Kozuka

(10) Patent No.: US 12,271,254 B2
(45) Date of Patent: Apr. 8, 2025

(54) INFORMATION PROCESSING APPARATUS THAT VERIFIES FALSIFICATION OF ACTIVATION PROGRAM, CONTROL METHOD THEREFOR, AND STORAGE MEDIUM

(71) Applicant: CANON KABUSHIKI KAISHA, Tokyo (JP)

(72) Inventor: Yasuhiro Kozuka, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 322 days.

(21) Appl. No.: 18/147,275

(22) Filed: Dec. 28, 2022

(65) Prior Publication Data

US 2023/0244559 A1    Aug. 3, 2023

(30) Foreign Application Priority Data

Feb. 1, 2022    (JP) ................................. 2022-014292

(51) Int. Cl.
*G06F 11/07*    (2006.01)
*G06F 21/57*    (2013.01)

(52) U.S. Cl.
CPC ...... *G06F 11/0724* (2013.01); *G06F 11/0772* (2013.01); *G06F 11/0793* (2013.01); *G06F 21/575* (2013.01)

(58) Field of Classification Search
CPC ............. G06F 11/0724; G06F 11/0772; G06F 11/0793; G06F 21/575; G06F 11/0763
See application file for complete search history.

(56) References Cited

U.S. PATENT DOCUMENTS

| 11,099,935 B2 | 8/2021 | Obayashi | |
| 2011/0044451 A1* | 2/2011 | Anzai | G06F 21/51 |
| | | | 711/E12.001 |
| 2019/0384588 A1* | 12/2019 | Yagi | G06F 21/554 |

FOREIGN PATENT DOCUMENTS

JP    2020057040 A    4/2020

* cited by examiner

*Primary Examiner* — Huan V Doan
(74) *Attorney, Agent, or Firm* — ROSSI, KIMMS & McDOWELL LLP

(57) ABSTRACT

An information processing apparatus that can perform error notification with ease and at a low cost in a case where falsification of an activation program is detected. The information processing apparatus has a main CPU for executing various programs, a sub CPU for verifying falsification of the activation program of the main CPU and perform recovery processing for the falsification, a FLASH Memory for storing a boot code of the activation program, a hardware sequencer for selectively switching one of the main CPU and the sub CPU so as to be capable of accessing the FLASH Memory, and a LED having three types of notification patterns. The hardware sequencer causes notification of the LED to change one of the three types of notification patterns according to both states of a falsification detection determination signal and an UNDER_RECOVERY signal from the sub CPU.

11 Claims, 8 Drawing Sheets

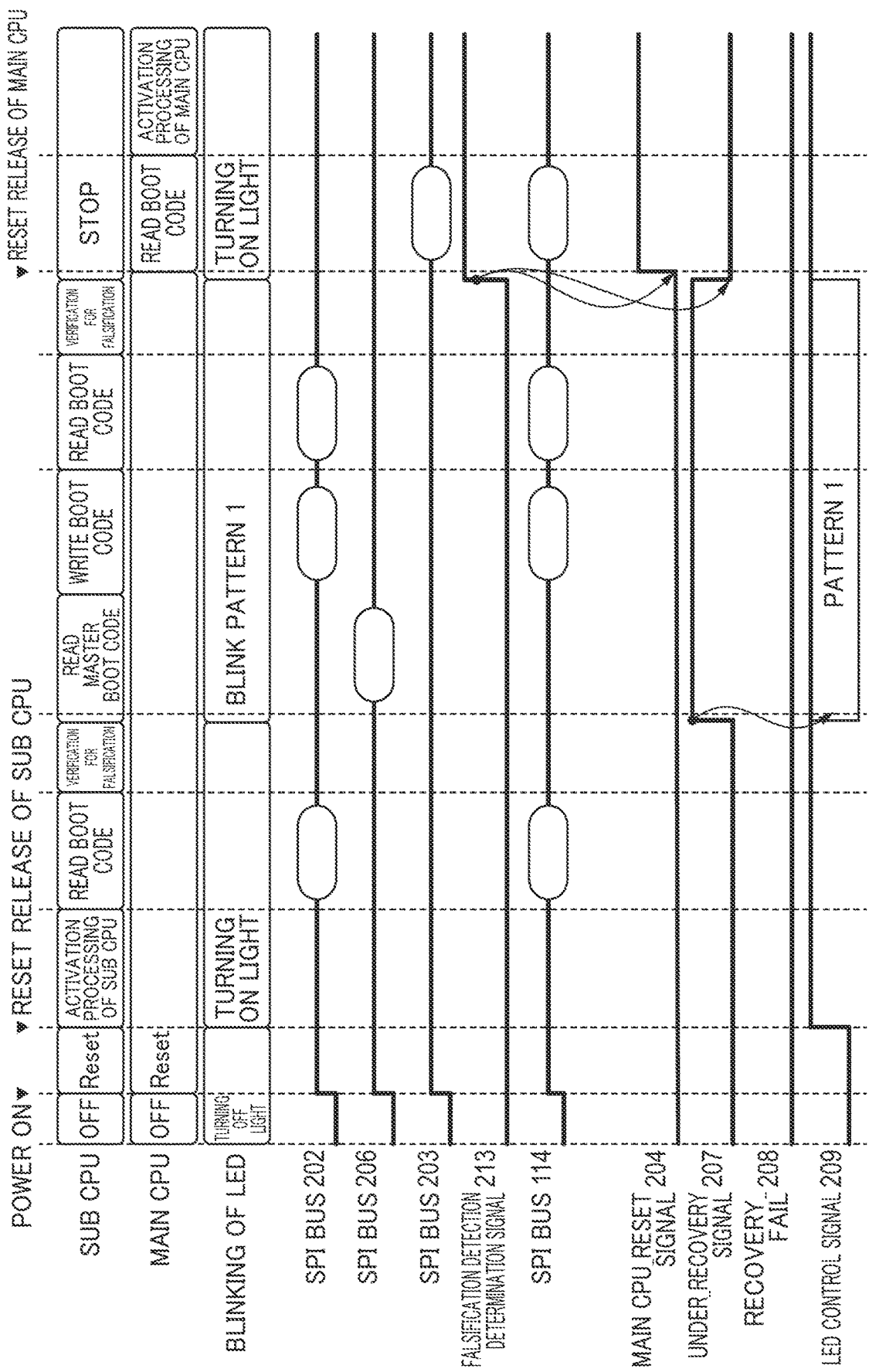

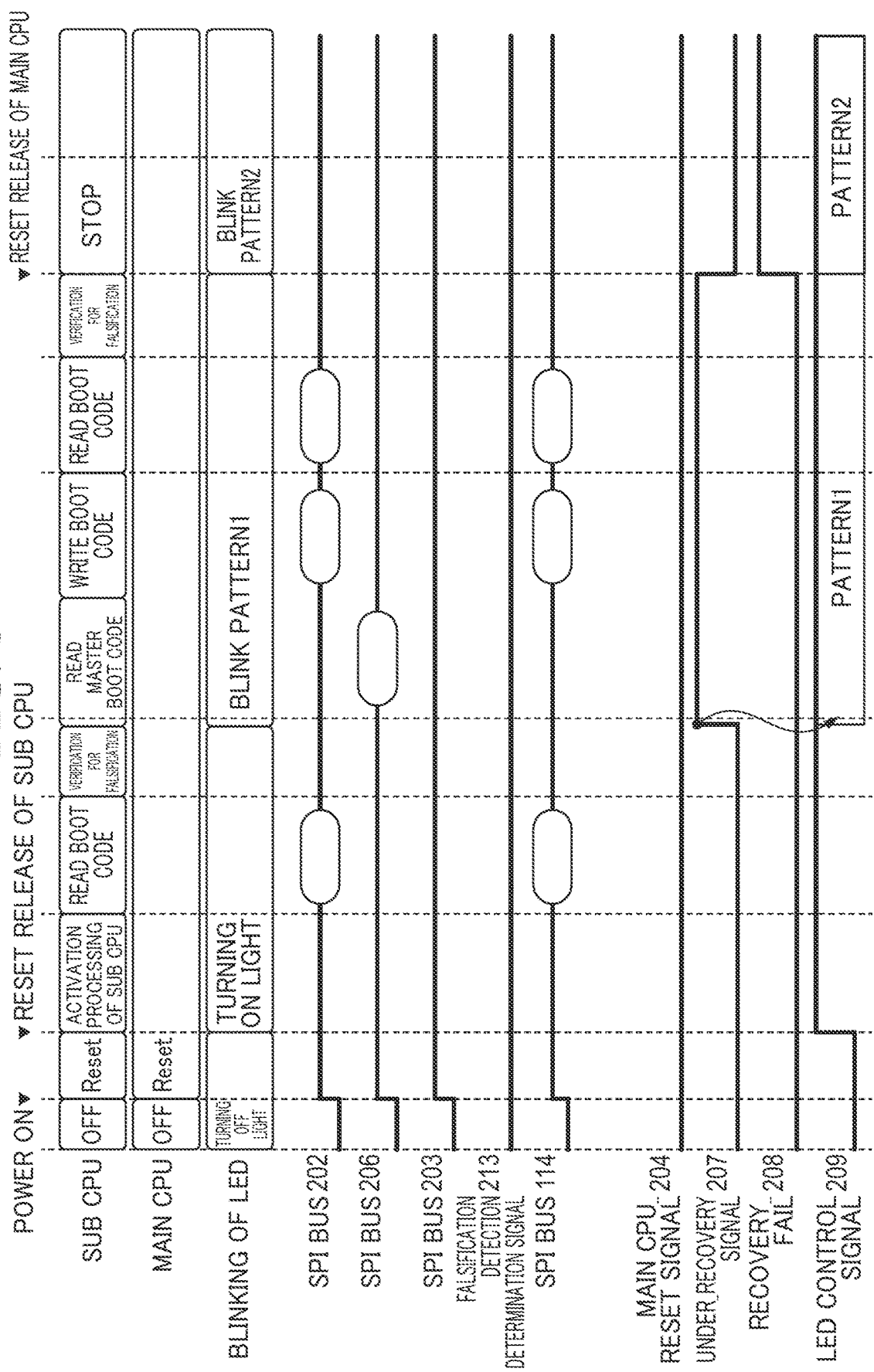

INFORMATION PROCESSING APPARATUS THAT VERIFIES FALSIFICATION OF ACTIVATION PROGRAM, CONTROL METHOD THEREFOR, AND STORAGE MEDIUM

BACKGROUND OF THE INVENTION

Field of the Invention

The present invention relates to an information processing apparatus, a control method therefor, and a storage medium, and in particular, to an information processing apparatus that verifies falsification of an activation program, a control method therefor, and a storage medium.

Description of the Related Art

In recent years, regarding software vulnerability, there is a problem of an attack of falsifying software and making bad use of a computer has become a problem. As a countermeasure against such an attack, a method for verifying falsification of an activation program executed by a CPU mounted in an information processing apparatus is known.

Normally, the CPU itself that executes the activation program cannot verify falsification of the activation program. Therefore, whether or not the activation program is falsified is verified by a CPU (hereinafter, referred to as a sub CPU) different from a CPU (hereinafter, referred to as a main CPU) that executes the activation program.

As standard requirements for security, when the falsification of the activation program is detected as a result of the verification, it is required to perform overwriting with a correct code by a safe method and perform reactivation. However, since it takes an overwriting time corresponding to a memory capacity to perform overwriting in order to perform overwriting and reactivation in response to the standard requirements, it is necessary to stop the activation of the main CPU during the overwriting time. Here, in a normal system, the main CPU also has a display control function, thus the information processing apparatus has a completely dark screen during the overwriting time. As a result, there is a possibility that a user cannot follow what is going on inside the information processing apparatus and feels uneasy, and then turns on and off the information processing apparatus carelessly.

As a method for preventing the user from turning on and off the apparatus carelessly, for example, in Japanese Laid-Open Patent Publication (kokai) No. 2020-57040, in a case where falsification of the activation program is detected, an error notification program is activated and error notification is performed by an operation part.

However, in order to perform the error notification with the operation part, the sub CPU needs to have a display control function to control display control hardware such as an LCD controller is required, on the other hand, in a normal system, the main CPU also has a display control function, which causes two display control functions in the information processing apparatus, and the cost is incurred.

SUMMARY OF THE INVENTION

The present invention provides an information processing apparatus that can perform error notification with ease and at a low cost in a case where falsification of an activation program is detected, a control method therefor, and a storage medium.

Accordingly, the present invention provides an information processing apparatus comprising a first CPU configured to execute various programs, a second CPU configured to verify falsification of an activation program of the first CPU and perform recovery processing for the falsification, a memory configured to store at least a boot code of the activation program, a switching unit configured to selectively switch one of the first CPU and the second CPU so as to be capable of accessing the memory, and a notification unit configured to have a plurality of notification patterns, wherein the second CPU outputs, to the switching unit, a first control signal that is changed to a high level in a case where there is no problem in a result obtained by verifying the falsification and changed to a low level in a case where there is the problem in the result obtained by verifying the falsification and a second control signal that is changed to the high level in a case where the recovery processing is being performed and changed to the low level in a case where the recovery processing is not being performed, and the switching unit causes notification of the notification unit to change one of the plurality of notification patterns according to both states of the first control signal and the second control signal.

Further features of the present invention will become apparent from the following description of exemplary embodiments (with reference to the attached drawings).

BRIEF DESCRIPTION OF THE DRAWINGS

FIG. 7 is a timing chart of each module and each signal of an information processing apparatus according to the present embodiment in a case where a first falsification detection result is NG, but a second falsification detection result after recovery processing is OK.

FIG. 8 is a timing chart of each module and each signal of an information processing apparatus according to the present embodiment in a case where a first falsification detection result is NG and a second falsification detection result after recovery processing is also NG.

DESCRIPTION OF THE EMBODIMENTS

The present invention will now be described in detail below with reference to the accompanying drawings showing embodiments thereof. It should be noted that the following embodiments do not limit the present invention according to the claims, and all combinations of features described in the present embodiments are not necessarily essential to means for solving the problem of the present invention.

Information Processing Apparatus

Figure 1:
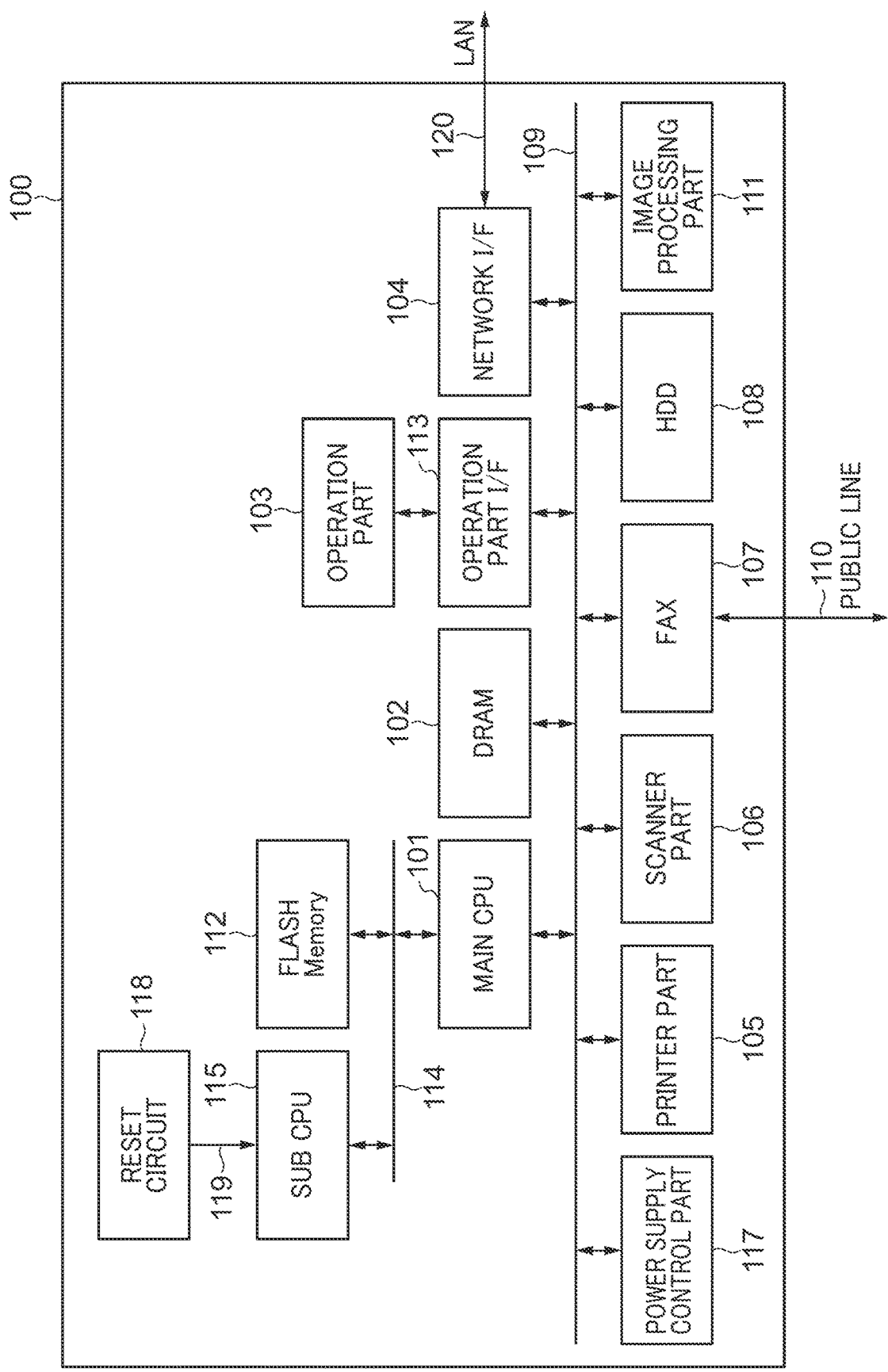
FIG. 1 is a simplified block diagram of an information processing apparatus according to the present embodiment.

FIG. 1 is a simplified block diagram of an information processing apparatus 100 according to the present embodiment.

In FIG. 1, the information processing apparatus 100 includes a main CPU 101, a DRAM 102, an operation part 103, a network I/F 104, a printer part 105, a scanner part 106, a FAX 107, an HDD 108, and a signal bus 109. The information processing apparatus 100 further includes an image processing part 111, a FLASH memory (registered trademark) 112, an SPI bus 114, a sub CPU 115, a power supply control part 117, and a reset circuit 118.

The main CPU 101 (first CPU) is a central processing unit (hereinafter, simply referred to as "CPU") and controls the entire information processing apparatus 100. The DRAM 102 is a dynamic random access memory, stores various programs executed by the main CPU 101, and functions as a temporary work area of data.

The operation part 103 includes a touch panel display, which serves as a notification part that receives an operation by a user and notifies the main CPU 101 of an operation content via an operation part I/F 113 and a display part including an LCD on which the main CPU 101 displays an apparatus state.

The network I/F 104 is connected to a LAN 120 and communicates with an external apparatus (not illustrated). The printer part 105 prints image data on a paper surface. The scanner part 106 optically reads an image on the paper surface and converts the image into an electrical signal to generate a scan image. The FAX 107 is connected to a public line 110 to perform facsimile communication with the external apparatus (not illustrated).

The HDD 108 is a hard disk drive, stores a program executed by the main CPU 101, and is also used as a spool area for a print job and a scan job. The HDD 108 is also used as an area for storing and reusing the scan image. The signal bus 109 connects modules to each other to perform communication.

The image processing part 111 executes processing of converting a print job received by the network I/F 104 into an image suitable for being printed by the printer part 105, and processing such as noise removal, color space conversion, rotation, and compression of a scan image read by the scanner part 106. The image processing part 111 also executes image processing for the scan image stored in the HDD 108.

Figure 2:
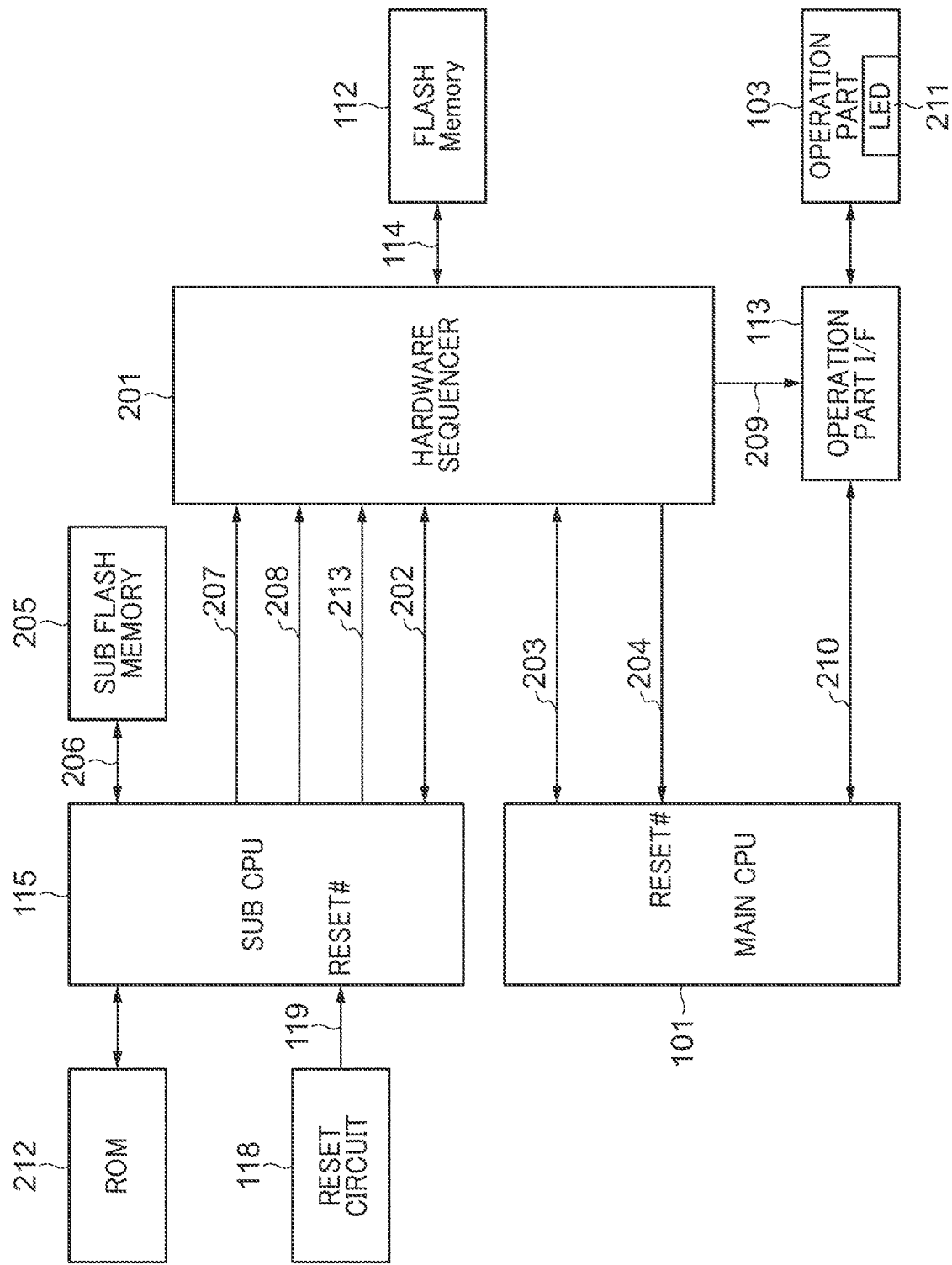
FIG. 2 is a detailed block diagram for explaining a flow of processing for a signal exchanged between an operation part I/F, a main CPU, and a sub CPU in FIG. 1 and a hardware sequencer connected all thereto.

The FLASH memory 112 (memory) stores an activation program including a boot code executed by the main CPU 101 and stores a default setting value of the information processing apparatus 100. The SPI bus 114 is a bus for interconnecting the main CPU 101, the FLASH memory 112, and the sub CPU 115. Although not illustrated in FIG. 1, a hardware sequencer 201 to be described later in FIG. 2 is also connected to the SPI bus 114.

The sub CPU 115 (second CPU) is a CPU and reads an activation program (boot code in the present embodiment) for the main CPU 101 from the FLASH memory 112 and verifies whether or not the activation program is falsified when the information processing apparatus 100 is started. As a method for detecting falsification, for example, public key information of a digital signature of a boot code is stored in a one time program (OTP) region of the sub CPU 115 at the time of manufacturing, and the read boot code is decrypted with the public key information to perform verification. Public key encryption means a value obtained by encrypting a hash value with a public key, and examples of the method include RSA-2048 and ECDSA. The sub CPU 115 and the main CPU 101 are connected to the hardware sequencer 201 (FIG. 2) (not illustrated in FIG. 1). When there is no problem in the result obtained by verifying falsification, the sub CPU 115 changes a falsification detection determination signal 213 (FIG. 2: first control signal) to "Hi" (high level) and transmits the result to the hardware sequencer 201. In this case, the hardware sequencer 201 transmits a reset signal of "Hi" to a reset terminal of the main CPU 101. This transmission releases the reset of the main CPU 101.

The power supply control part 117 controls power supply to each module in the information processing apparatus 100.

When a power switch (not illustrated) of the information processing apparatus 100 is turned on, the reset circuit 118 changes the level of a reset signal 119 (FIG. 2) transmitted to the sub CPU 115 after a predetermined delay time from "Lo" (low level) to "Hi" (high level). When the reset signal 119 becomes the "Hi" level, the reset is released, and the sub CPU 115 starts to be activated.

FIG. 2 is a detailed block diagram for explaining a flow of processing for a signal exchanged between the operation part I/F 113, main CPU 101, and sub CPU 115 and the hardware sequencer 201 connected all thereto.

Although not illustrated in FIG. 1, as illustrated in FIG. 2, the information processing apparatus 100 further includes the hardware sequencer 201, a sub FLASH memory 205, an LED 211 in the operation part 103, and a ROM 212.

The hardware sequencer 201 (switching unit) is communicably connected to the sub CPU 115 and the main CPU 101, and has a switching function of selectively switching one of the sub CPU 115 and the main CPU 101 so as to be accessible to the FLASH memory 112. Specifically, the hardware sequencer 201 selects one of a SPI bus 202 connected to the sub CPU 115 and a SPI bus 203 connected to the main CPU 101 according to a falsification detection determination signal 213 indicating a result of the verification by the sub CPU 115. Thereafter, the hardware sequencer 201 outputs the signal from the selected bus to the FLASH memory 112 via the SPI bus 114.

A reset signal 204 is a signal transmitted from the hardware sequencer 201 to the reset terminal of the main CPU 101, and changes a level from a "Lo" level to a "Hi" level according to a change in the falsification detection determination signal 213 to release the reset of the main CPU 101.

The sub FLASH memory 205 is a memory (not illustrated in FIG. 1) that stores a boot code to be read as a master in a case where the FLASH memory 112 is falsified. The sub FLASH memory 205 is connected to a SPI bus 206 accessible only from the sub CPU 115.

An UNDER_RECOVERY signal 207 (second control signal) is a signal for notifying that the sub CPU 115 is performing recovery processing, and is transmitted from the sub CPU 115 to the hardware sequencer 201. The recovery processing is processing in which the sub CPU 115 overwrites the falsified activation program (boot code in the present embodiment) with a correct code by a safe method and perform reactivation, and the details thereof will be described later in steps S310 and S311 of FIG. 3.

A RECOVERY_FAIL signal 208 (third control signal) is a signal for notifying an error in a case where recovery processing cannot be performed (that is, the falsification detection result is not OK even when falsification is verified again after the recovery processing), and is transmitted from the sub CPU 115 to the hardware sequencer 201.

The LED 211 (notification unit) is inside the operation part 103 and has two types of blinking as notification patterns in addition to lighting. Specifically, the LED 211 notifies the user that recovery processing is being performed with blinking of a pattern 1 (first notification pattern) and that recovery processing cannot be performed with blinking of a pattern 2 (second notification pattern). The LED 211 notifies the user that it is normal by turning on the light (pattern 0).

An LED control signal 209 is a signal for controlling the LED 211 in the operation part 103 via the operation part I/F 113, and is transmitted from the hardware sequencer 201 to the operation part I/F 113. The hardware sequencer 201 changes a method for controlling the LED 211 in the operation part 103 according to a state of the signal received from the sub CPU 115 and notifies a falsification detection state. That is, the LED control signal 209 changes the notification pattern of the LED 211 according to states of the UNDER_RECOVERY signal 207, the RECOVERY_FAIL signal 208, and the falsification detection determination signal 213, which are transmitted from the sub CPU 115. Details of this control method will be described later with reference to FIG. 4 and FIGS. 6 to 8.

An LCD control signal 210 is a signal for displaying an apparatus state on the display part of the operation part 103 via the operation part I/F 113 after the main CPU 101 is activated.

The ROM 212 is a memory (not illustrated in FIG. 1) that stores activation software and falsification verifying software of the sub CPU 115, and is directly connected to the sub CPU 115.

Figure 3:
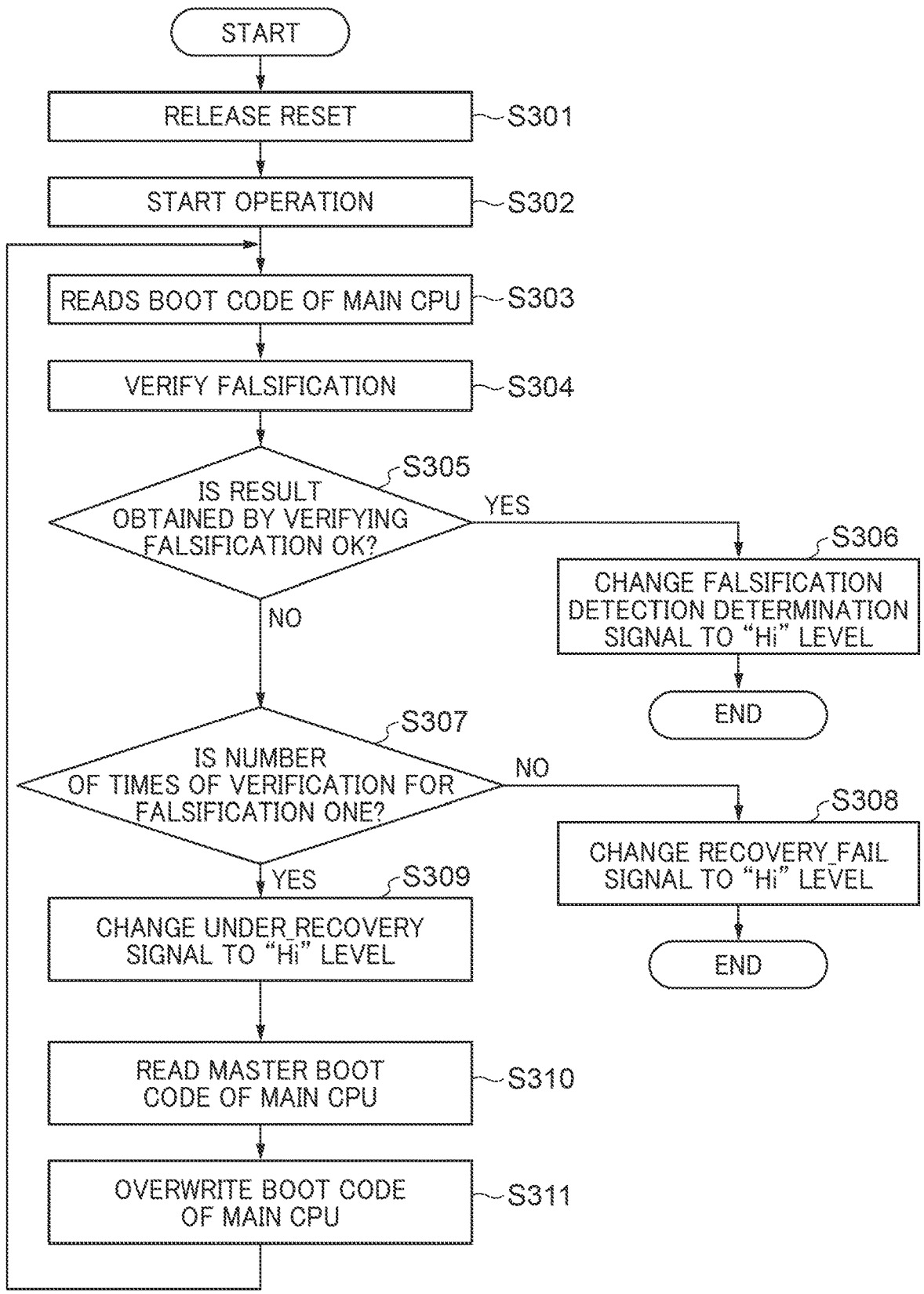
FIG. 3 is a flowchart of falsification verifying processing according to the present embodiment, which is executed by the sub CPU.

FIG. 3 is a flowchart of falsification verifying processing according to the present embodiment, which is executed by the sub CPU 115.

When a power switch (not illustrated) of the information processing apparatus 100 is turned on, this processing starts.

First, in step S301, the reset circuit 118 changes a level of the reset signal 119 transmitted to the sub CPU 115 from a "Lo" level to a "Hi" level. The changing of the level of the reset signal 119 releases the reset of the sub CPU 115.

In step S302, the sub CPU 115 reads the activation software in the ROM 212 to start the operation, and then reads the falsification verifying software stored in the ROM 212.

Next, in step S303, the sub CPU 115 reads a boot code for the main CPU 101 in the FLASH memory 112 via the hardware sequencer 201.

In step S304, the sub CPU 115 verifies the falsification of the boot code read in step S303, and determines whether or not a result obtained by verifying falsification is OK in step S305. In a case where the result obtained by verifying falsification is OK (YES in step S305), the processing proceeds to step S306. On the other hand, in a case where the result obtained by verifying falsification is NG (NO in step S305), the processing proceeds to step S307.

In step S306, the sub CPU 115 changes the falsification detection determination signal 213 transmitted to the hardware sequencer 201 to a "Hi" level and ends this processing.

In step S307, the sub CPU 115 determines whether or not the number of times of verification for falsification is one. In a case where the number of times of verification for falsification is one (YES in step S307), the processing proceeds to step S309. On the other hand, in a case where the number of times of verification for falsification is not one (NO in step S307), the processing proceeds to step S308.

In step S309, the sub CPU 115 changes the UNDER_RECOVERY signal 207 transmitted to the hardware sequencer 201 to "Hi" level, notifies that recovery processing is being performed, and causes the processing to proceed to step S310.

In step S310, the sub CPU 115 reads a master boot code for the main CPU 101, which is stored in the sub FLASH memory 205, and causes the processing to proceed to step S311.

In step S311, the sub CPU 115 overwrites the boot code for which falsification is detected and which is stored in the FLASH memory 112 with the master boot code read in step S310, and then returns the processing to step S303. As a result, the sub CPU 115 reads the master boot code for the main CPU 101 again, and performs the second time of verification for falsification in step S304. As the determination result in step S305, when the falsification verifying result after the recovery processing is OK, the processing proceeds to step S306, the falsification detection determination signal 213 is changed to the "Hi" level, and this processing ends. In this case, the UNDER_RECOVERY signal 207 is also changed from "Hi" level to "Lo" level. On the other hand, as a result of the determination processing in step S305, in a case where the falsification verifying result is not OK even when the recovery processing is performed, the processing proceeds from step S307 to step S308. In step S308, the sub CPU 115 changes the RECOVERY_FAIL signal 208 transmitted to the hardware sequencer 201 to the "Hi" level. According to this, with the LED 211 in the operation part 103, the user is notified that recovery processing cannot be performed, and then this processing ends.

Figure 4:
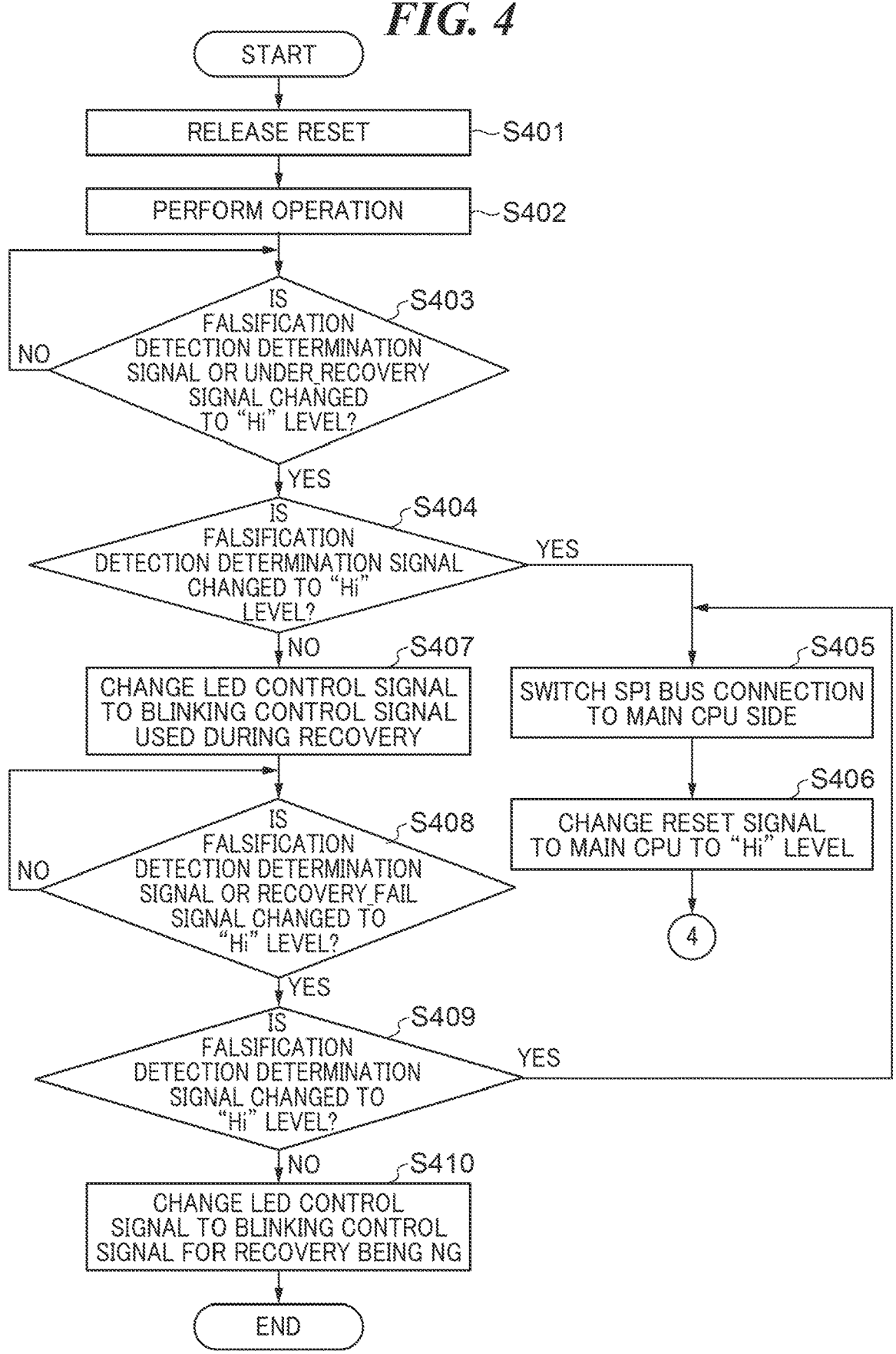
FIG. 4 is a flowchart of notification processing of a falsification verifying result according to the present embodiment, which is executed by the hardware sequencer.

FIG. 4 is a flowchart of notification processing of a falsification verifying result according to the present embodiment, which is executed by the hardware sequencer 201.

When a power switch (not illustrated) of the information processing apparatus 100 is turned on, this processing starts.

First, in step S401, at timing when the reset circuit 118 changes a level of the reset signal 119 transmitted to the sub CPU 115 from a "Lo" level to a "Hi" level, the reset of the hardware sequencer 201 is released, and the operation is performed in step S402.

In step S403, the hardware sequencer 201 monitors whether the falsification detection determination signal 213 from the sub CPU 115 or the UNDER_RECOVERY signal 207 from the sub CPU 115 is changed to the "Hi" level. As a result of the monitoring, in a case where it is determined that any one of the signals is changed to the "Hi" level (YES in step S403), the processing proceeds to step S404.

In step S404, the hardware sequencer 201 determines whether or not the signal changed to the "Hi" level in step S403 is the falsification detection determination signal 213. In a case where the signal changed to the "Hi" level is the falsification detection determination signal 213 (YES in step S404), the processing proceeds to step S405. On the other hand, in a case where the signal changed to "Hi" level is the UNDER_RECOVERY signal 207 (NO in step S404), the processing proceeds to step S407.

In step S405, the hardware sequencer 201 switches SPI bus connection to the FLASH memory 112, in which the boot code for the main CPU 101 is stored, into connection to the SPI bus 203 from the main CPU 101, and the processing proceeds to step S406.

In step S406, the hardware sequencer 201 changes the reset signal 204 transmitted to the main CPU 101 from the "Lo" level to the "Hi" level, and then ends this processing.

In step S407, the hardware sequencer 201 changes the LED control signal 209 to a control signal (blinking control signal used during recovery) for instructing the LED 211 to blink the pattern 1 indicating that the recovery processing is being performed, and then the processing proceeds to step S408.

In step S408, the hardware sequencer 201 waits for the falsification verifying result from the sub CPU 115 again. That is, the hardware sequencer 201 monitors whether any one of the falsification detection determination signal 213 or the UNDER_RECOVERY signal 207 is changed to the "Hi" level. As a result of the monitoring, in a case where it is determined that any one of the signals is changed to the "Hi" level (YES in step S408), the processing proceeds to step S409.

In step S409, the hardware sequencer 201 determines whether or not the signal changed to the "Hi" level in step S408 is the falsification detection determination signal 213. In a case where the signal changed to the "Hi" level is the falsification detection determination signal 213 (YES in step S409), the processing proceeds to step S405, and then the processing described above will be performed. At this time, the hardware sequencer 201 returns the LED control signal 209 changed to the blinking control signal used during recovery in step S407 to the control signal of the initial setting, and ends the notification to the user with the LED 211 that the recovery processing is being performed. On the other hand, in a case where the signal changed to "Hi" level is the UNDER_RECOVERY signal 207 (NO in step S409), the processing proceeds to step S410.

In step S410, the hardware sequencer 201 changes the LED control signal 209 to a control signal (blinking control signal for recovery being NG) for instructing the LED 211 to blink the pattern 2 indicating that the recovery processing cannot be performed, and then ends this processing.

Figure 5:
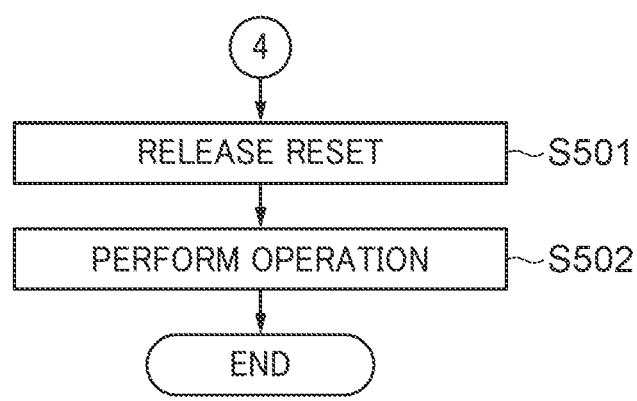
FIG. 5 is a flowchart of activation processing according to the present embodiment, which is executed by the main CPU.

FIG. 5 is a flowchart of activation processing according to the present embodiment, which is executed by the main CPU 101.

When the hardware sequencer 201 changes the reset signal 204 transmitted to the main CPU 101 from the "Lo" level to the "Hi" level in step S406, the processing starts.

The reset of the main CPU 101 is released by the changing of the level of the reset signal 204 in step S501, and the processing proceeds to step S502.

In step S502, the main CPU 101 reads the boot code in which the falsification verifying result stored in the FLASH memory 112 is OK, performs various normal operations, and then ends this processing.

Figure 6:
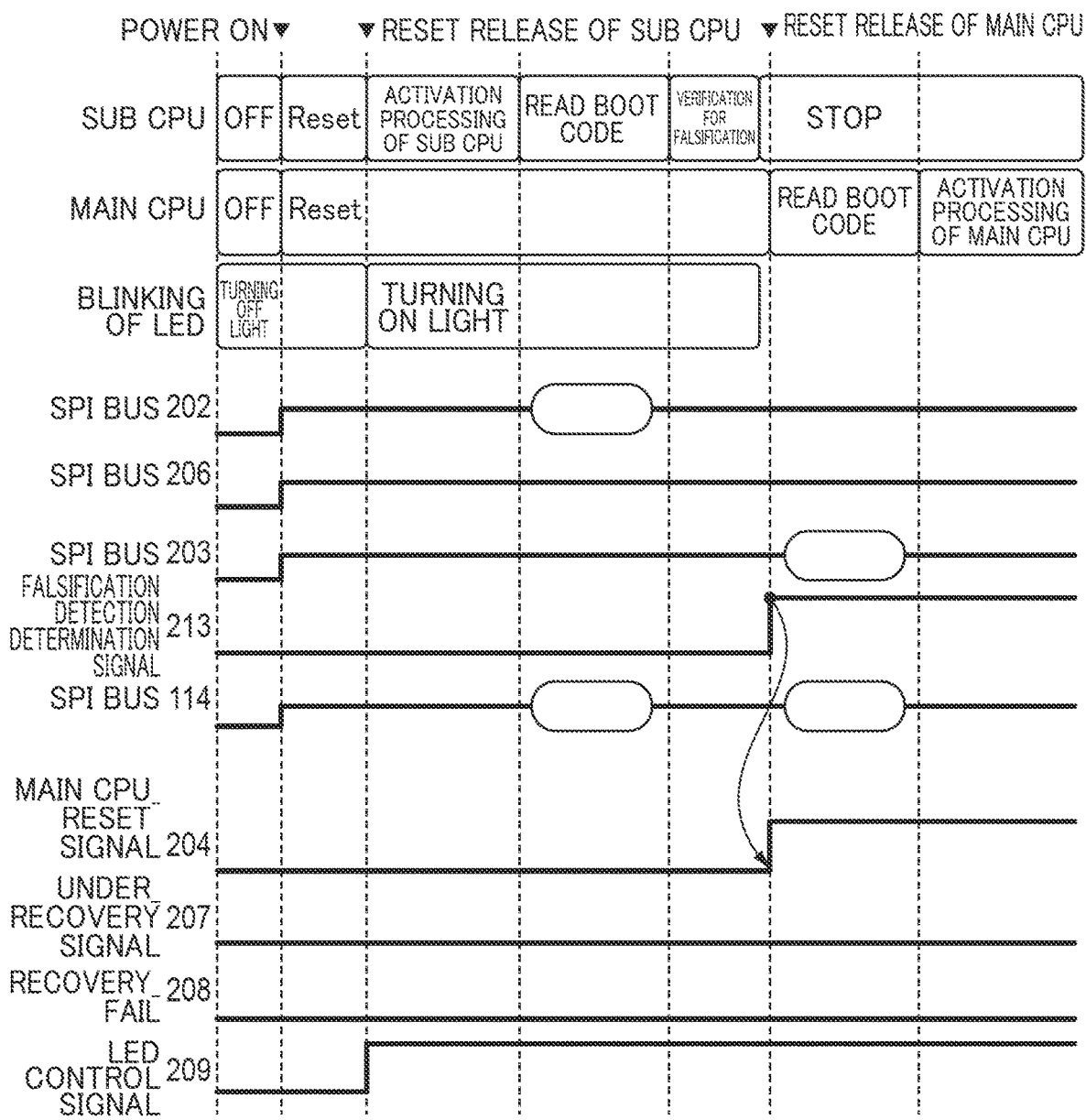
FIG. 6 is a timing chart of each module and each signal of an information processing apparatus according to the present embodiment at the time of a normal startup, that is, in a case where a first falsification detection result is OK.

FIG. 6 is a timing chart of each module and each signal of the information processing apparatus 100 according to the present embodiment at the time of a normal startup, that is, in a case where the falsification is not found as a result obtained by verifying falsification immediately after the activation by the sub CPU 115 (a first falsification detection result is OK).

First, when a power switch (not illustrated) of the information processing apparatus 100 is turned on, the reset signal 119 transmitted from the reset circuit 118 to the sub CPU 115 after a predetermined delay time is changed from the "Lo" level to the "Hi" level, and the reset of the sub CPU 115 is released. When the reset of the sub CPU 115 is released, the sub CPU 115 reads the activation software from the ROM 212 and starts the activation processing. At this time, the reset of the hardware sequencer 201 is also released. When the reset of the hardware sequencer 201 is released, the hardware sequencer 201 is connected to the SPI buses 114 and 202, and the LED control signal 209 transmitted from the hardware sequencer 201 to the operation part I/F 113 is changed to the "Hi" level, and the LED 211 lights up.

After the activation processing, the sub CPU 115 reads the boot code of the main CPU 101, which is stored in the FLASH memory 112, via the SPI bus 202, the hardware sequencer 201, and the SPI bus 114 to verify falsification. In a case where the falsification is not found as a result obtained by verifying falsification, the sub CPU 115 changes the level of the falsification detection determination signal 213 from the "Lo" level to the "Hi" level. The hardware sequencer 201 switches the connection from the SPI bus 202 to the SPI bus 203 according to the changing of the level of the falsification detection determination signal 213 to the "Hi" level. The hardware sequencer 201 changes the reset signal 204 transmitted to the main CPU 101 from the "Lo" level to the "Hi" level. The reset of the main CPU 101 is released when the reset signal 204 is changed to the "Hi" level. When the reset of the main CPU 101 is released, the main CPU 101 can access the FLASH memory 112 via the SPI bus 203, the hardware sequencer 201, and the SPI bus 114, and reads the stored boot code to perform the activation processing.

FIG. 7 is a timing chart of each module and each signal of the information processing apparatus 100 according to the present embodiment in a case where the falsification is found (a first falsification detection result is NG), but a second falsification detection result after recovery processing is OK.

Since the flow until the sub CPU 115 performs the verification for the falsification after the activation processing is similar to that in FIG. 6, the description thereof will be omitted.

In a case where falsification is found as a result obtained by verifying falsification, the sub CPU 115 changes the UNDER_RECOVERY signal 207 transmitted to the hardware sequencer 201 to the "Hi" level in order to perform recovery processing. The hardware sequencer 201 switches the LED control signal 209 to the blinking control signal used during recovery when the UNDER_RECOVERY signal 207 is changed to the "Hi" level, and causes the LED 211 to blink the pattern 1. During this period, the sub CPU 115 performs processing of recovering the falsified FLASH memory 112, and then verifies the falsification again.

In a case where the falsification is not found (a second falsification detection result is OK) as a result obtained by verifying the falsification again after the recovery processing, the sub CPU 115 changes the falsification detection determination signal 213 from the "Lo" level to the "Hi" level. The hardware sequencer 201 switches the connection from the SPI bus 202 to the SPI bus 203 according to the changing of the level of the falsification detection determination signal 213 to the "Hi" level. The hardware sequencer 201 changes the reset signal 204 transmitted to the main CPU 101 from the "Lo" level to the "Hi" level. The sub CPU 115 changes the level of the UNDER_RECOVERY signal 207 from "Hi" level to the "Lo" level. The hardware sequencer 201 returns the LED control signal 209 to the normal lighting control when the UNDER_RECOVERY signal 207 is changed to the "Lo" level. The subsequent operations are the same as those at the time of normal activation, and thus are omitted.

FIG. 8 is a timing chart of each module and each signal of an information processing apparatus 100 according to the present embodiment in a case where a first falsification detection result is NG and a second falsification detection result after recovery processing is also NG.

Since the flow until the sub CPU 115 performs the verification for the falsification after the recovery processing again is similar to that in FIG. 7, the description thereof will be omitted.

In a case where a result obtained by verifying the falsification again after the recovery processing (a second falsification detection result) is NG, the sub CPU 115 changes the RECOVERY_FAIL signal 208 transmitted to the hardware sequencer 201 to the "Hi" level. The sub CPU 115 returns the UNDER_RECOVERY signal 207 transmitted to the hardware sequencer 201 to the "Lo" level. The hardware sequencer 201 switches the LED control signal 209 to the blinking control signal for recovery being NG according to the changes of these signals, and causes the LED 211 to blink by switching between the pattern 1 and the pattern 2.

As described above, according to the present embodiment, in a case where the sub CPU 115 detects falsification of the activation program after the power switch is turned on, the hardware sequencer 201 changes the notification pattern of the LED 211 according to a state of each signal output from the sub CPU 115. That is, even in a state in which the main CPU 101 is not activated and the screen of the touch panel of the operation part 103 cannot be displayed, the information processing apparatus 100 can notify the user that recovery processing is being performed or recovery processing cannot be performed with ease and at a low cost.

In the present embodiment, the notification pattern of the LED 211 is changed according to the current state of the information processing apparatus 100, but the present invention is not limited to the LED 211 as long as a device that performs notification to the user and can be controlled by the hardware sequencer 201 is provided. For example, the device that performs notification to the user may be a buzzer that changes the type of alarm as the notification pattern according to the current state of the information processing apparatus 100, or may be a vibration generator that changes the type of vibration as the notification pattern according to the current state of the information processing apparatus 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-14292, filed Feb. 1, 2022 which is hereby incorporated by reference herein in its entirety.

What is claimed is:

1. An information processing apparatus comprising:
a first central processing unit (CPU) configured to execute various programs;
a second CPU configured to verify falsification of an activation program of the first CPU and perform recovery processing for the falsification;
a memory configured to store at least a boot code of the activation program;
a switching unit configured to selectively switch one of the first CPU and the second CPU so as to be capable of accessing the memory; and
a notification unit configured to have a plurality of notification patterns,
wherein the second CPU outputs, to the switching unit, a first control signal that is changed to a high level in a case where there is no problem in a result obtained by verifying the falsification and changed to a low level in a case where there is the problem in the result obtained by verifying the falsification, and a second control signal that is changed to the high level in a case where the recovery processing is being performed and changed to the low level in a case where the recovery processing is not being performed, and
the switching unit causes notification of the notification unit to change one of the plurality of notification patterns according to both states of the first control signal and the second control signal.

2. The information processing apparatus according to claim 1, wherein in a case where the falsification is detected by first verification for falsification after a power switch of the information processing apparatus is turned on, the second CPU starts the recovery processing and switches the second control signal from the low level to the high level.

3. The information processing apparatus according to claim 2, wherein in a case where the second control signal is switched to the high level, the switching unit instructs the notification unit to perform notification with a first notification pattern.

4. The information processing apparatus according to claim 3, wherein in a case where the falsification is not detected by second verification for falsification after the started recovery processing, the second CPU switches the first control signal from the low level to the high level and returns the second control signal to the low level.

5. The information processing apparatus according to claim 4, wherein in a case where the first control signal is switched to the high level, the switching unit instructs the notification unit to end notification with the first notification pattern and instructs the first CPU to perform reset release.

6. The information processing apparatus according to claim 2, wherein the second CPU further outputs, to the switching unit, a third control signal for notifying whether or not the activation program is capable of being recovered, and the switching unit further causes notification of the notification unit to change to one of the plurality of notification patterns according to both states of the second control signal and the third control signal.

7. The information processing apparatus according to claim 6, wherein in a case where the falsification is detected by second verification for falsification after the started recovery processing, the second CPU returns the second control signal to the low level, and switches the third control signal from the low level to the high level at which it is notified that the activation program is not capable of being recovered.

8. The information processing apparatus according to claim 7, wherein in a case where the second control signal returns to the low level and the third control signal is switched to the high level, the switching unit instructs the notification unit to perform notification with a second notification pattern.

9. The information processing apparatus according to claim 1, wherein the notification unit is a light-emitting diode (LED), and the LED has lighting and two types of blinking as the notification pattern.

10. A control method for an information processing apparatus including a first central processing unit (CPU) that executes various programs, a second CPU that verifies falsification of an activation program of the first CPU and performs recovery processing for the falsification, a memory that stores at least a boot code of the activation program, a switching unit that selectively switches one of the first CPU and the second CPU so as to be capable of accessing the memory, and a notification unit that has a plurality of notification patterns, the control method comprising:

an outputting step of outputting, from the second CPU to the switching unit, a first control signal that is changed to a high level in a case where there is no problem in a result obtained by verifying the falsification and changed to a low level in a case where there is the problem in the result obtained by verifying the falsification, and a second control signal that is changed to the high level in a case where the recovery processing is being performed and changed to the low level in a case where the recovery processing is not being performed; and an outputting step of outputting, from the switching unit to the notification unit, a control signal for causing notification of the notification unit to change one of the plurality of notification patterns according to both states of the first control signal and the second control signal.

11. A non-transitory computer-readable storage medium storing a program for causing a computer to execute a control method for an information processing apparatus having a first central processing unit (CPU) that executes various programs, a second CPU that verifies falsification of an activation program of the first CPU and performs recovery processing for the falsification, a memory that stores at least a boot code of the activation program, a switching unit that selectively switches one of the first CPU and the second CPU so as to be capable of accessing the memory, and a notification unit that has a plurality of notification patterns, the control method comprising:

an outputting step of outputting, from the second CPU to the switching unit, a first control signal that is changed to a high level in a case where there is no problem in a result obtained by verifying the falsification and changed to a low level in a case where there is the problem in the result obtained by verifying the falsification, and a second control signal that is changed to the high level in a case where the recovery processing is being performed and changed to the low level in a case where the recovery processing is not being performed; and an outputting step of outputting, from the switching unit to the notification unit, a control signal for causing notification of the notification unit to change one of the plurality of notification patterns according to both states of the first control signal and the second control signal.

\* \* \* \* \*